United States Patent
Takasawa et al.

(10) Patent No.: US 12,060,643 B2
(45) Date of Patent: *Aug. 13, 2024

(54) COATED ALUMINUM MATERIAL AND METHOD FOR PRODUCING SAME

(71) Applicant: NIPPON LIGHT METAL COMPANY, LTD., Tokyo (JP)

(72) Inventors: Reiko Takasawa, Shizuoka (JP); Akira Kaneko, Shizuoka (JP)

(73) Assignee: NIPPON LIGHT METAL COMPANY, LTD., Tokyo (JP)

(*) Notice: Subject to any disclaimer, the term of this patent is extended or adjusted under 35 U.S.C. 154(b) by 214 days.

This patent is subject to a terminal disclaimer.

(21) Appl. No.: 16/611,010

(22) PCT Filed: Feb. 8, 2018

(86) PCT No.: PCT/JP2018/004349
§ 371 (c)(1),
(2) Date: Nov. 5, 2019

(87) PCT Pub. No.: WO2018/207416
PCT Pub. Date: Nov. 15, 2018

(65) Prior Publication Data
US 2020/0157687 A1  May 21, 2020

(30) Foreign Application Priority Data
May 8, 2017  (JP) ................. 2017-092280

(51) Int. Cl.
*C23C 22/05* (2006.01)
*C22C 21/00* (2006.01)
*C23C 22/73* (2006.01)
*C23C 22/83* (2006.01)

(52) U.S. Cl.
CPC ............. *C23C 22/05* (2013.01); *C22C 21/00* (2013.01); *C23C 22/73* (2013.01); *C23C 22/83* (2013.01); *C23C 2222/20* (2013.01)

(58) Field of Classification Search
None
See application file for complete search history.

(56) References Cited

U.S. PATENT DOCUMENTS

| | | | |
|---|---|---|---|
| 4,588,025 A | 5/1986 | Imai et al. | |
| 2005/0282945 A1* | 12/2005 | Faris | ........................ C09D 7/20 524/430 |
| 2009/0136747 A1* | 5/2009 | Kikuchi | ............... C10M 125/00 428/458 |
| 2015/0217545 A1* | 8/2015 | Endo | .................... B29C 65/8215 156/151 |
| 2016/0068687 A1 | 3/2016 | Nakamura et al. | |
| 2016/0243794 A1 | 8/2016 | Hirano et al. | |
| 2020/0061973 A1* | 2/2020 | Takasawa | ................ B05D 7/14 |

FOREIGN PATENT DOCUMENTS

| | | | |
|---|---|---|---|
| JP | 58-177473 A | 10/1983 | |
| JP | H01-299877 A | 12/1989 | |
| JP | H03-77440 B2 | 12/1991 | |
| JP | 2005-200757 A | 7/2005 | |
| JP | 2008-050692 A | 3/2008 | |
| JP | 2008-050693 A | 3/2008 | |
| JP | 5125284 B2 | 1/2013 | |
| JP | 5125285 B2 | 1/2013 | |
| WO | 01/07679 A1 | 2/2001 | |
| WO | 01/007680 A1 | 2/2001 | |
| WO | WO-0107679 A1 * | 2/2001 | ............. C23C 22/60 |
| WO | 03/085171 A1 | 10/2003 | |

OTHER PUBLICATIONS

PCT International Preliminary Report on Patentability dated Nov. 12, 2019 filed in PCT/JP2018/004349, total 9 pages.
International Search Report dated Apr. 24, 2018 filed in PCT/JP2018/004349.
Extended European Search Report (EESR) dated Jan. 29, 2021 of the corresponding European Patent application No. 18798607.0.

* cited by examiner

Primary Examiner — Alexander M Weddle
(74) Attorney, Agent, or Firm — RANKIN, HILL & CLARK LLP

(57) ABSTRACT

Provided is a coated aluminum material having a coating film on a surface of an aluminum material, and capable of exerting excellent corrosion resistance even under severe use conditions while being chromium-free. The coating film is formed on a surface of the aluminum material with a silica-containing film including a water dispersible silica, a phosphorus compound, and a silane coupling agent provided therebetween. The silica-containing film includes 0.5 to 35 mass % of a silane coupling agent, and has Si and P contents of 2 to 60, and 0.1 to 6.0 mg/m$^2$, respectively, and a P/Si mass ratio of P content and Si content of 0.02 to 0.15. Further, provided is a method for producing such a coated aluminum material.

6 Claims, No Drawings

COATED ALUMINUM MATERIAL AND METHOD FOR PRODUCING SAME

TECHNICAL FIELD

This invention relates to a coated aluminum material including an aluminum material including aluminum or an aluminum alloy, and a coating film excellent in both corrosion resistance and adhesion on a surface of the aluminum material, and a method for producing the same.

BACKGROUND ART

For the corrosion resistant treatment of an aluminum material, methods using a chromium-based surface-treating agent for a chromate treatment, a chromate phosphate treatment, or the like have been widely known, and these methods have been widely performed even today (see PTL 1 to 3).

However, a trend for regulating the use of environmentally hazardous substances has also grown worldwide in recent years. For example, in EU, legal regulation regarding hexavalent chromium has started by the End-of Life Vehicles Directive, or the like.

From such circumstances, the present inventors have proposed a coated aluminum material in which a coating film is formed on a surface of an aluminum material via an inorganic film (silica-containing film) containing silicon oxide within the range of a silicon amount of 5 to 200 mg/m$^2$ and a silicon content of 25 to 46.7 mass %, and containing a phosphorus compound within the range of a phosphorus amount of 0.1 to 20 mg/m$^2$ and a phosphorus content of 0.2 to 10 mass % (PTL 4), and further proposed a coated aluminum material in which a coating film is formed on a surface of an aluminum material via an inorganic film (silica-containing film) containing a silicon compound within the range of a silicon amount of 5 to 200 mg/m$^2$ and a silicon content of 30 to 46.7 mass %, and containing a phosphorus compound within the range of a phosphorus amount of 0.1 to 20 mg/m$^2$ and a phosphorus content of 0.2 to 10 mass %, and containing an organic binder within the range of 35 mass % or less (PTL 5). Then, the coated aluminum materials are so-called "chromium-free" substantially not containing hexavalent and trivalent chromium at all, and are environmentally friendly, and are further excellent in corrosion resistance, and have been used in a large number of fields including automobile industry requiring a coated aluminum material excellent in corrosion resistance, and the like.

Further, PTL 6 proposes a surface-treated metal sheet excellent in adhesion with a resin (plastic), in which a chemically-treated film (silica-containing film) and an adhesive layer are stacked in this order on a metal substrate such as a cold-rolled steel sheet or a zinc-plated steel sheet, and the chemically-treated film (silica-containing film) may include a colloidal silica and a thermosetting resin, and may also include a silane coupling agent and phosphoric acids in specific ratios. Further, PTL 6 proposes a metal-sheet-composite resin molded product preferable for uses of automobile, home electrical appliance products, office automation equipment, and the like obtained using the surface treated metal sheet.

CITATION LIST

Patent Literature (PTL)

[PTL 1] Japanese Patent Application Publication No, H01-299,877
[PTL 2] Japanese Examined Patent Publication No. H02-042,389
[PTL 3] Japanese Examined Patent Publication No. H03-077,440
[PTL 4] Japanese Patent No. 5,125,284
[PTL 5] Japanese Patent No. 5,125,285
[PTL 6] Japanese Patent Application Publication No. 2015-110,318

SUMMARY OF INVENTION

Technical Problem

In the fields of, for example, construction material, transportation, electrical machinery, and electrons, products are often used outdoors depending upon the intended use thereof. Accordingly, various products manufactured using a coated aluminum material may be used under still more severe environment than in the cases of other fields. Further, in the fields of electrical machinery, electrons, transportation, and the like, there may be a demand for a coated aluminum material having a coating film with a film thickness as large as 30 μm or more, and further 40 μm or more in total obtained in the following manner: processing such as pressing is performed on the coated aluminum material; further, after the processing, the surface was subjected to coating such as post coating. Furthermore, a condition wherein a coating film with a film thickness as relatively large as 5 μm or more, and further 10 μm or more even when the film thickness is less than 30 μm is used, and a condition where the coating film is used under the severe wet environment as described above may be combinedly imposed. Then, in the case of such use under severe wet environment, or when there is a demand for a coating film with a large film thickness as large as 30 μm or more alone or in total, or further when a condition where a coating film with a relatively large film thickness is used and a condition where the coating film is used under severe wet environment are combinedly imposed (these may be hereinafter referred to as "under severe use conditions"), the adhesion between the aluminum material and the coating film may be reduced. This still more excellent corrosion resistance is demanded.

Under such circumstances, in order to further improve the coated aluminum materials in PTL 4 and 5, and to respond to such a demand, for the evaluation of the corrosion resistance, the present inventors adopted not a conventional filiform corrosion resistance test for observing and evaluating the appearance of corrosion but a wetting test capable of evaluating the adhesion between the aluminum material and the coating film under severe conditions. Thus, the present inventors further conducted a close study to develop a coated aluminum material capable of exerting an excellent corrosion resistance also in the wetting test. As a result, the present inventors unexpectedly found the following: when a silica-containing film containing a water dispersible silica and a phosphorus compound is formed on a surface of an aluminum material, not only the content or content ratio of silicon (Si) or phosphorus (P) is controlled, but also a silane coupling agent is allowed to be present at a specific ratio, and the P/Si mass ratio of the P content to the Si content is controlled within a given specific range; as a result, excellent corrosion resistance is exerted even under the severe use conditions while being chromium-free. This led to the completion of the present invention.

Therefore, it is an object of the present invention to provide a coated aluminum material having an aluminum material including aluminum or an aluminum alloy, and a coating film on a surface thereof, and capable of exerting excellent corrosion resistance even under severe use conditions while being chromium-free.

Solution to Problem

Namely, the present invention is a coated aluminum material including an aluminum material including aluminum or an aluminum alloy, and a coating film formed on a surface of the aluminum material with a silica-containing film including a water dispersible silica, a phosphorus compound, and a silane coupling agent provided therebetween. The silica-containing film includes the silane coupling agent in a ratio of 0.5 to 35 mass %, and has a Si content falling within the range of 2 to 60 mg/m$^2$, a P content falling within the range of 0.1 to 6.0 mg/m$^2$, and a P/Si mass ratio of the P content to the Si content falling within the range of 0.02 to 0.15.

Further, the present invention is a method for producing a coated aluminum material. The coated aluminum material includes an aluminum material including aluminum or an aluminum alloy, and a coating film formed on a surface of the aluminum material with a silica-containing film including a water dispersible silica, a phosphorus compound, and a silane coupling agent provided therebetween. The method includes forming the silica-containing film including the silane coupling agent in a ratio of 0.5 to 35 mass %, and having a Si content falling within the range of 2 to 60 mg/m$^2$, a P content falling within the range of 0.1 to 6.0 mg/m$^2$ on a surface of the aluminum material; and then, forming the coating film on the silica containing film.

Note that, in the following description of the present invention, "the film thickness of the coating film" may refer to the film thickness of the topcoat coating film when the coating film stacked on a surface of the aluminum material is a single layer of the topcoat coating film. Whereas, when the coating film is a multilayered film of two or more layers of topcoat coating films, including a primer coating film, being stacked, "the film thickness of the coating film" may refer to a "total coating film thickness", which means total film thickness In the present invention, examples of aluminum materials include rolled material, extruded material, die-cast material, cast material, and the like, including aluminum or an aluminum alloy, processed materials obtained by appropriately processing these, further, combined materials resulting from appropriate combinations of the materials, and the like.

Further, in the present invention, for the silica-containing film formed on a surface of the aluminum material, it is necessary that, the silicon content (Si content) falls within the range of 2 mg/m$^2$ or more and 60 mg/m$^2$ or less, preferably 2 mg/m$^2$ or more and 45 mg/m$^2$ or less, and more preferably 4 mg/m$^2$ or more and 40 mg/m$^2$ or less, and the phosphorus content (P content) falls within the range of 0.1 mg/m$^2$ or more and 6.0 mg/m$^2$ or less, preferably 0.3 mg/m$^2$ or more and 5 mg/m$^2$ or less, and more preferably 0.3 mg/m$^2$ or more and 3.0 mg/m$^2$ or less, and the P/Si mass ratio of the P content to the Si content falls within the range of 0.02 or more and 0.15 or less, preferably 0.02 or more and 0.13 or less, and more preferably 0.04 or more 0.13 or less. Further, desirably, the content of the silane coupling agent is 0.5 mass % or more and 35 mass % or less, preferably 1 mass % or more and 25 mass % or less, and more preferably 4 mass % or more and 21 mass % or less. In the present invention, unless these four conditions are satisfied at the same time, the corrosion resistance under the severe use conditions is reduced, and the adhesion between the aluminum material and the coating film is reduced. Accordingly, the durability of coated aluminum material is impaired.

Then, as for the film thickness of the silica-containing film, it is generally desirable that the film thickness is 5 nm or more 500 nm or less, and preferably 20 nm or more 300 nm or less. Further, it is desirable that, in the silica-containing film, the silicon content (Si content) is 30 mass % or more and 50 mass % or less, and preferably 35 mass % or more and 45 mass % or less, and the phosphorus content (P content) is 0.8 mass % or more and 5.5 mass % or less, and preferably 1 mass % or more and 5 mass % or less. When the film thickness of the inorganic film is smaller than 5 nm, the filiform corrosion resistance may be insufficient. Conversely, when the film thickness is larger than 500 nm, the adhesion may be insufficient. Whereas, when the Si content in the silica-containing film is smaller than 30 mass %, the filiform corrosion resistance may be reduced. Conversely, when the Si content is larger than 50 mass %, it becomes difficult to form the film with general-purpose raw materials, resulting in a higher cost. Further, when the P content in the silica-containing film is smaller than 0.8 mass %, the corrosion resistance may be reduced. Conversely, when the P content is larger than 5.5 mass %, the adhesion may be deteriorated.

Herein, examples of the water dispersible silica for use in the silica-containing film of the present invention may include colloidal silica, and vapor phase silica, and preferably colloidal silica. Then, the colloidal silica is not particularly limited. Specific examples thereof may include spheroidal colloidal silicas such as SNOWTEX-C, SNOWTEX-O, SNOWTEX-N, SNOWTEX-S, SNOWTEX-OL, SNOWTEX-XS, and SNOWTEX-XL manufactured by Nissan Chemical Corporation, and chain colloidal silicas such as SNOWTEX-UP and SNOWTEX-OUP manufactured by Nissan Chemical Corporation. Further, examples of vapor phase silicas may include AEROSIL 130, AEROSIL 200, AEROSIL 200CF, AEROSIL 300, AEROSIL 300CF, AEROSIL 380, and AEROSIL MOX80 manufactured by Nippon Aerosil Co., Ltd.

Further, the phosphorus compound for use in the silica-containing film is added for the purpose of improving the corrosion resistance of one layer or for some other purposes, and is not particularly limited. Preferably, examples thereof may include orthophosphoric acid, phosphonic acid, pyrophosphoric acid, tripolyphosphoric acid, and mixtures of one or two or more selected from salts thereof. Specifically, phosphoric acid, triammonium phosphate, trisodium phosphate, aluminum phosphate, zinc phosphate, magnesium phosphate, and the like can be exemplified.

Further, the silane coupling agent for use in the silica-containing film is added for the purpose of imparting the adhesion and the corrosion resistance or for some other purposes, and is not particularly limited. The silane coupling agent is preferably a silane coupling agent having a reactive functional group such as vinyl group, epoxy group, styryl group, methacryl group, acryl group, amino group, ureido group, mercapto group, sulfido group, isocyanato group, thiocarbonyl group, halo group, or triazine thiol group as a reactive group, and is not particularly limited so long as it finally generates a reactive silanol group. Specific examples thereof may include vinyltrimethoxysilane, 2-(3,4-epoxy-cyclohexyl)ethyltrimethoxysilane, 3-glycidoxypropyltri-ethoxy-silane, p-styryltrimethoxysilane, 3-methacryloxy-propyl-trimethoxysilane, 3-acryloxypropyltrimethoxy-silane, 3-aminopropyltrimethoxysilane, 3-aminopropyltri-ethoxysilane, 3-ureidopropyltriethoxysilane, 3-mercapto-propylmethyldimethoxysilane, 3-mercaptopropyltrimethoxysilane, bis(triethoxysilyl-propyl)tetrasulfide, and 3-isocyanatopropyltriethoxysilane. The silane coupling agents may be used alone, or may be used in mixture of two or more thereof. Further, an alkoxy oligomer having an alkoxy silyl group and the reactive functional group in combination is also acceptable. Further, a silicone alkoxy oligomer including a triazine thiol group in the molecule, or the like is also acceptable.

Then, the water dispersible silica, the phosphorus compound, and the silane coupling agent forming the silica-containing film of the present invention are prepared as a film-forming treatment solution when the silica-containing film is formed on a surface of the aluminum material. The film-forming treatment solution is preferably formed as aqueous solution or an alcohol solution. At that step, if required, a third component such as a surface conditioner, an antimicrobial agent, a fungicide, or a solvent except for water and alcohol is added. For this reason, in the silica-containing film of the present invention, in addition to the water dispersible silica, the phosphorus compound, and the silane coupling agent, the components derived from the third component may be present.

In the present invention, for the coating film to be formed on a surface of the aluminum material with a silica-containing film provided thereunder, the coating film to be formed by being coated directly on the silica-containing film may be a topcoat coating film forming the outermost layer of the coated aluminum material, or may be a topcoat coating film coated with a primer coating film functioning as a primer layer provided thereunder. Alternatively, the coating film may be a multilayered film of two or more layers of topcoat coating films stacked one on another. The total coating film thickness of the coating film to be formed on the silica-containing film is appropriately selected and determined according to the intended purpose of the coated aluminum material, and the like, and is not particularly limited, and desirably, in general, 0.5 µm or more and 200 µm or less, and preferably 2 µm or more and 150 µm or less. Particularly, the lower limit value thereof is desirably 5 µm or more with which the advantageous effects of the present invention becomes apparent in terms of each adhesion after the wetting test and after the boiling water immersion test, preferably 10 µm or more, and more preferably 30 µm or more. When the total coating film thickness of the coating film is smaller than 0.5 µm, a sufficient corrosion resistance is not exerted. Conversely, when the total coating film thickness of the coating film exceeds 200 µm, the adhesion may be reduced.

Herein, the coating film to be formed on the aluminum material surface with a silica-containing film interposed therebetween is not particularly limited. The coating film may only be a coating film formed by coating any paint (coating film-forming paint) selected from paints of organic, inorganic, or organic/inorganic hybrid type such as acryl-based paints, polyester-based paints, urethane-based paints, acrylic urethane-based paints, acrylic polyester-based paints, epoxy-based paints, fluorine-based paints, acrylic silicon-based paints, urethane silicon-based paints, acrylic urethane silicon-based paints, ceramic-based paints, and titanium oxide-based paints on the silica-containing film on the aluminum material surface, and preferably an acrylic-based paint, a polyester-based paint, an urethane-based paint, an epoxy-based paint, or the like.

Hereinafter, a description will be given to a manufacturing method for manufacturing the coated aluminum material of the present invention.

As for manufacturing of the coated aluminum material of the present invention, preferably, before the film-forming treatment of forming a silica-containing film on a surface of the aluminum material, the surface of the aluminum material may be previously subjected to a pretreatment such as a degreasing treatment or a surface conditioning treatment. Examples of the degreasing treatment may include solvent cleaning using a thinner or the like, and a degreasing treatment using a commercially available acid or alkaline degreasing agent. Further, as the surface conditioning treatment, mention may be made of an acid treatment with an acid solution, and preferably an acid solution with a pH of 6 or less, an alkali treatment with an alkali solution, and preferably an alkali solution with a pH of 8 or more, and/or the like. Herein, as the acid solution for use in the acid treatment of the surface conditioning treatment, examples which can be used may include, for example, the one prepared using the commercially available acid degreasing agent, the one prepared using organic acids including mineral acid such as sulfuric acid, nitric acid, hydrofluoric acid, or phosphoric acid, acetic acid, citric acid, and the like, and the one prepared using an acid reagent including a mixed acid obtained by mixing the mineral acid and the organic acid, or the like. Whereas, as the alkali solution, examples which can be used may include, for example, the one prepared using a commercially available alkaline degreasing agent, the one prepared using an alkali reagent such as sodium hydroxide, the one prepared using a sodium silicate type degreasing agent, and the one prepared by mixing these.

To the surface conditioning treatment of the pretreatment performed using the acid solution and/or the alkali solution, the same method as the operation method and the treatment conditions conventionally performed in the surface conditioning treatment using this kind of acid solution or alkali solution is applicable. For example, with the method such as an immersion method or a spray method, the treatment is performed under the treatment conditions of a treatment temperature of from room temperature to 90° C., and preferably from room temperature to 70° C., a treatment time of about 1 second to 15 minutes, preferably about 2 seconds to 10 minutes, and more preferably from 2 seconds to 3 minutes per step, and the number of steps of generally 2 or more and 6 or less, and preferably 2 or more and 4 or less. Note that, in the surface conditioning treatment of the pretreatment performed using the acid solution and/or the alkali solution a surface of the aluminum material may be etched, or may not be etched.

Then, after subjecting the surface of the aluminum material to the pretreatment, if required, a water washing treatment may be performed. For the water washing treatment, industrial water, ground water, tap water, ion exchanged water, or the like can be used, and is appropriately selected according to the coated aluminum material to be prepared. Further, the aluminum material subjected to the pretreatment is subjected to a dry treatment, if required. The dry treatment may be air drying of being allowed to stand at room temperature, or may be forced drying performed using an air blow, a dryer, a far infrared heater, an oven, or the like.

On a surface of the aluminum material thus subjected to the pretreatment, if required, the film-forming treatment solution including a water dispersible silica, a phosphorus compound, and a silane coupling agent is coated, thereby forming the silica-containing film of the present invention. Herein, for preparing the film-forming treatment solution, the water dispersible silica, the phosphorus compound, and the silane coupling agent are mixed with a necessary third component in a solvent such as water or alcohol so as to attain a Si content in the silica-containing film formed on a surface of the aluminum material of 2 mg/m² or more and 60 mg/m² or less, a P content of 0.1 mg/m² or more and 6.0 mg/m² or less, and a P/Si mass ratio of the P content to the Si content of 0.02 or more and 0.15 or less, and a content of the silane coupling agent of 0.5 mass % or more and 20 mass % or less.

The film formation treatment when the silica-containing film is formed on a surface of the aluminum material is carried out by, for example, a pre-coating method with a roll coating method, a spray coating method, an immersion method, a bar coating method, an electrostatic coating method, or the like, or a post-coating method with a spray coating method, a spin coating method, an immersion method, an electrostatic coating method, or the like. Further, at that step, if required, a dry treatment is performed after coating. The dry treatment may also be air drying of allowing to stand at room temperature, or may also be forced drying performed using an air blow, a dryer, a far infrared heater, an oven, or the like. When forced drying is performed, forced drying is desirably performed under conditions of generally room temperature to 250° C., for about 1 second to 10 minutes, and preferably about 2 seconds to 5 minutes.

In the present invention, the coating film-forming paint is coated on the silica-containing film thus formed, thereby to form a coating film. The coating method at that step may be, for example, a pre-coating method with a roll coating method, a spray coating method, an immersion method, a bar coating method, an electrostatic coating method, or the like, or a post-coating method with a spray coating method, a spin coating method, an immersion method, an electrostatic coating method, or the like. Examples of methods which can be exemplified may include a method performed using, for example, an air blow, a dryer, or an oven under drying conditions of room temperature to 300° C., and for 5 seconds to 24 hours.

Further, also for the case where the coating film is a multilayered film, the same method may be applied as the case where a general topcoat coating paint is coated to form a topcoat coating film. For example, it a topcoat paint is coated on the coating film of the formed first layer by a pre-coating method such as a roll coating method, a spray coating method, an immersion method, a bar coating method, or an electrostatic coating, or a post-coating method such as a spray coating method, a spin coating method, an immersion method, or an electrostatic coating method, and then, drying is performed by the drying method according to the coated topcoat paint.

Effects of Invention

In accordance with the present invention, it is possible to provide a coated aluminum material having a coating film on a surface of an aluminum material and capable of exerting an excellent corrosion resistance even under severe use conditions, while being chromium-free.

Further, it is possible to easily produce a coated aluminum material capable of exerting an excellent corrosion resistance even under severe use conditions, while being chromium-free.

DESCRIPTION OF EMBODIMENTS

Hereinafter, preferred embodiments of the present invention will be specifically described by way of Examples and Comparative Examples.

Examples 1 to 10 and Comparative Examples 1 to 8

As an aluminum material, an aluminum sheet (JIS 5052-H18) with dimensions of 70 mm×150 mm×1.0 mm was prepared. Each prepared aluminum sheet of respective Examples and Comparative Examples was subjected to a pretreatment, a film-forming treatment of a silica-containing film, and formation of a coating film shown below, thereby preparing each coated aluminum material of respective Examples and Comparative Examples.

[Pretreatment]
In respective Examples and Comparative Examples, each of the aluminum sheets was subjected to the following pretreatment.

Namely, a degreasing treatment in which the aluminum sheet was immersed in a 2 mass % aqueous solution of a degreasing agent (trade name: SURFCLEANER 155 manufactured by NIPPON PAINT Co., Ltd.) containing sodium metasilicate under the conditions of 60° C. and 30 seconds was performed, followed by water washing and drying.

[Film-Forming Treatment]
As a treatment solution for forming a silica-containing film, using the colloidal silicas and additive resins, and the like shown in Table 1, the phosphorus compounds, the silane coupling agents, and water or isopropanol (iso-PrOH) as a solvent shown in Table 2, a film-forming treatment solution with each composition shown in Table 2 was prepared.

TABLE 1

| Types of colloidal silica, additive resin, etc. | | | | | |
|---|---|---|---|---|---|
| | | Manufacturer | Solid content Concentration (wt %) | Average Particle Size (nm) | Dispersion medium |
| Colloidal silica | ST-C | Nissan Chemical Corporation | 20 | 10 to 20 | Water |
| | ST-O | Nissan Chemical Corporation | 20 | 10 to 21 | Water |
| | ST-UP | Nissan Chemical Corporation | 20 | 40 to 300 chain-shaped | Water |
| | ST-OL | Nissan Chemical Corporation | 20 | 40 to 50 | Water |

TABLE 1-continued

Types of colloidal silica, additive resin, etc.

|  |  | Manufacturer | Solid content Concentration (wt %) | Average Particle Size (nm) | Dispersion medium |
|---|---|---|---|---|---|
|  | ST-40 | Nissan Chemical Corporation | 40 | 10 to 20 | Water |
|  | IPA-ST | Nissan Chemical Corporation | 30 | 10 to 20 | iso-PrOH |
| Additive resin, etc. | Acumer 1510 | manufactured by Rohm & Haas Co. | 25 | Organic binder: Polyacrylic acid | |
|  | Pentalite | KOEI CHEMICAL COMPANY Ltd. | — | Cross linker: Pentaerythritol | |
|  | MODEPICS 302 | ARAKAWA CHEMICAL INDUSTRIES Ltd. | 33 | Acrylic modified epoxy resin emulsion | |

TABLE 2

Composition of film-forming treatment solution

|  |  | Examples |  |  |  |  |  |  |  |  |
|---|---|---|---|---|---|---|---|---|---|---|
|  |  | 1 | 2 | 3 | 4 | 5 | 6 | 7 | 8 | 9 |
| Colloidal silica | ST-C | — | — | 4.5 | — | — | — | — | — | — |
|  | ST-O | — | 15 | — | — | — | — | 15 | — | 15 |
|  | ST-OL | 48 | — | — | — | — | — | — | — | — |
|  | ST-UP | — | — | — | 0.9 | 9 | — | — | — | — |
|  | ST-40 | — | — | — | — | — | — | — | — | — |
|  | IPA-ST | — | — | — | — | — | 15 | — | 15 | — |
| Phosphorus compound | Phosphoric acid | 1.8 | 0.3 | 0.13 | 0.02 | 0.4 | 0.4 | 0.2 | 0.4 | 0.2 |
| Silane coupling agent | KBE403 (epoxy group) | 0.2 | — | — | — | 0.1 | — | — | — | — |
|  | KBE803 (thiol group) | — | 0.3 | — | 0.03 | — | 1 | 0.1 | 1.6 | 0.1 |
|  | KBE903 (amino group) | — | — | 0.05 | — | — | — | — | — | — |
| Additive resin, etc. | Acumer 1510 | — | — | — | — | — | — | — | — | — |
|  | Pentalite | — | — | — | — | — | — | — | — | — |
|  | MODEPICS302 | — | — | — | — | — | — | — | — | — |
| The balance | Water | 50 | 84.4 | 95.32 | 5.0 | 90.5 | 10.0 | 84.7 | 10.0 | 84.7 |
|  | iso-PrOH | — | — | — | 94.05 | — | 73.6 | — | 73.0 | — |

|  |  | Example | Comparative Examples |  |  |  |  |  |  |  |
|---|---|---|---|---|---|---|---|---|---|---|
|  |  | 10 | 1 | 2 | 3 | 4 | 5 | 6 | 7 | 8 |
| Colloidal silica | ST-C | — | — | — | — | — | — | — | — | — |
|  | ST-O | — | 2 | 15 | — | 50 | 50 | — | — | — |
|  | ST-OL | — | — | — | — | — | — | — | 12 | — |
|  | ST-UP | 0.45 | — | — | — | — | — | 9 | — | — |
|  | ST-40 | — | — | — | — | — | — | — | — | 50 |
|  | IPA-ST | — | — | — | 3.5 | — | — | — | — | — |
| Phosphorus compound | Phosphoric acid | 0.01 | 0.1 | 0.3 | 0.1 | 0.3 | 0.3 | 0.5 | 0.3 | — |
| Silane coupling agent | KBE403 (epoxy group) | — | — | — | — | — | — | 0.1 | — | — |
|  | KBE803 (thiol group) | 0.05 | — | 2.0 | — | 0.3 | 0.3 | — | — | — |
|  | KBE903 (amino group) | — | — | — | — | — | — | — | — | 10 |
| Additive resin, etc. | Acumer 1510 | — | — | — | — | — | — | — | 0.1 | — |
|  | Pentalite | — | — | — | — | — | — | — | 0.003 | — |
|  | MODEPICS302 | — | — | — | — | — | — | — | — | 50 |
| The balance | Water | 5 | 97.9 | 82.7 | 5.0 | 49.4 | 49.4 | 90.4 | 87.6 | — |
|  | iso-PrOH | 94.49 | — | — | 91.4 | — | — | — | — | — |

[Manufacturing of Coated Aluminum Material]

In each of Examples 1, 3, and 5 to 9, and Comparative Examples 1 to 7, after completion of the pretreatment, using a bar coater, the film-forming treatment solution with each composition shown in Table 2 was coated so as to achieve a coating amount of 1 g/m². Then, at a peak temperature (PMT: Peak metal temperature) of 180° C., drying was performed for 1 minute, thereby forming a silica-containing film on a surface of the aluminum sheet.

Further, in Example 2, after completion of the pretreatment, using a bar coater, the film-forming treatment solution with each composition shown in Table 2 was coated so as to achieve a coating amount of 2.5 g/m². Then, at a PMT of 180° C., drying was performed for 1 minute, thereby forming a silica-containing film on a surface of the aluminum sheet.

Further, in Example 4, after completion of the pretreatment, using a spray gun, the film-forming treatment solution with each composition shown in Table 2 was coated so as to achieve a coating amount of 25 g/m². Then, at a PMT of 180° C., drying was performed for 1 minute, thereby forming a silica-containing film on a surface of the aluminum sheet.

Further, in Example 10, after completion of the pretreatment, using a spray gun, the film-forming treatment solution with each composition shown in Table 2 was coated so as to achieve a coating amount of 50 g/m². Then, at a PMT of 180° C., drying was performed for 1 minute, thereby forming a silica-containing film on a surface of the aluminum sheet.

Further, in Comparative Example 8, after completion of the pretreatment, using a bar coater, the film-forming treatment solution with each composition shown in Table 2 was coated so as to achieve a coating amount of 1 g/m². Then, at a PMT of 100° C., drying was performed for 1 minute, thereby forming a silica-containing film on a surface of the aluminum sheet.

As for each silica-containing film of respective Examples and Comparative Examples formed as described above, the silicon content (Si content: mg/m²) and the phosphorus content (P content: mg/m²) contained in film unit area were measured by fluorescent X ray analysis, respectively. For this measurement, a silica-containing film was prepared on a 99.999% pure aluminum sheet by the same method as that in respective Examples and Comparative Examples. Thus, the silicon content (Si content: mg/m²) and the phosphorus content (P content: mg/m²) contained in unit area of the silica-containing film were subjected to quantitative analysis.

[Formation of Coating Film]

For the coating film staked on a surface of the aluminum sheet with the silica-containing film provided therebetween, using the coating film-forming paints shown in Table 3 described below, coating films with respective film thicknesses shown in Table 3 were formed, respectively, in the order of a first layer, a second layer, and a third layer.

TABLE 3

| | Coating film-forming paint | | | |
|---|---|---|---|---|
| | Name of paint | Manufacturer | Resin type | Color |
| A | PrecolorTX4427 | BASF | Polyester type | White |
| B | V nit #120 | DAI NIPPON TORYO Co., Ltd. | Epoxy type | Clear |
| C | V nit #500 | DAI NIPPON TORYO Co., Ltd. | Polyester type | Clear |
| D | V-PET#4000W | DAI NIPPON TORYO Co., Ltd. | Polyester type | Grey |
| E | V top H intermediate coat | DAI NIPPON TOKYO Co., Ltd. | Polyurethane type | White |
| F | V top H top coat | DAI NIPPON TOKYO Co., Ltd. | Polyurethane type | White |

For each aluminum sheet of respective Examples and Comparative Examples after performing the pretreatment and the film-forming treatment, a coating film was formed in the following manner, thereby preparing each specimen (coated aluminum material) of respective Examples and Comparative Examples.

In Example 1, a paint A was subjected to bar coat coating, and was subjected to a baking treatment at a PMT of 210° C. for 60 seconds to be dried, thereby forming a coating film with a film thickness (total coating film thickness) of 30 μm.

In Example 2, a paint B was subjected to bar coat coating, and was subjected to a baking treatment at a PMT of 210° C. for 60 seconds to be dried, thereby forming a coating film with a film thickness of 5 μm. Then, a paint E was coated by a spray gun, thereby forming a 50-μm coating film, and was baked in a heating furnace set at 80° C. for 5 minutes. Further, a paint F was coated by a spray gun, thereby forming a 50-μm coating film, and was baked in a heating furnace set at 80° C. for 10 minutes, resulting in preparation of a specimen (coated aluminum material) with a total coating film thickness of 105 μm.

In Example 3, the paint B was subjected to bar coat coating, and was subjected to a baking treatment at a PMT of 210° C. for 40 seconds to be dried, thereby forming a coating film with a film thickness of 10 μm. Then, a paint C was subjected to bar coat coating, and was subjected to a baking treatment at a PMT of 225° C. for 60 seconds to be dried, thereby forming a coating film with a film thickness of 30 μm, resulting in preparation of a specimen (coated aluminum material) with a total coating film thickness of 40 μm.

In Example 4, a paint D was subjected to electrostatic powder coating, and was baked in a heating furnace set at 180° C. for 30 minutes, thereby forming a coating film with a film thickness (total coating film thickness) of 100 μm, resulting in preparation of a specimen (coated aluminum material).

In Example 5, the paint B was subjected to bar coat coating, and was subjected to a baking treatment at a PMT of 210° C. for 40 seconds to be dried, thereby forming a coating film with a film thickness of 2 μm. Then, the paint A was subjected to bar coat coating, and was subjected to a baking treatment at a PMT of 210° C. for 60 seconds to be dried, thereby forming a coating film with a film thickness of 30 μm, resulting in preparation of a specimen (coated aluminum material) with a total coating film thickness of 32 μm.

In Example 6, the paint C was subjected to bar coat coating, and was subjected to a baking treatment at a PMT of 225° C. for 60 seconds to be dried, thereby forming a coating film with a film thickness (total coating film thickness) of 20 µm.

In Example 7, the paint B was subjected to bar coat coating, and was subjected to a baking treatment at a PMT of 225° C. for 60 seconds to be dried, thereby forming a coating film with a film thickness (total coating film thickness) of 5 µm, resulting in preparation of a specimen (coated aluminum material).

In Example 8, the paint C was subjected to bar coat coating, and was subjected to a baking treatment at a PMT of 225° C. for 60 seconds to be dried, thereby forming a coating film with a film thickness (total coating film thickness) of 35 µm.

In Example 9, the paint B was subjected to bar coat coating, and was subjected to a baking treatment at a PMT of 225° C. for 60 seconds to be dried, thereby forming a coating film with a film thickness (total coating film thickness) of 40 µm, resulting in preparation of a specimen (aluminum coated material).

In Example 10, the paint D was subjected to electrostatic powder coating, and was baked in a heating furnace set at 180° C. for 30 minutes, thereby forming a coating film with a film thickness (total coating film thickness) of 50 µm, resulting in preparation of a specimen (coated aluminum material).

In Comparative Example 1, the paint D was subjected to electrostatic powder coating, and was baked in a furnace set at 180° C. for 30 minutes, thereby forming a coating film with a film thickness (total coating film thickness) of 100 µm, resulting in preparation of a specimen (coated aluminum material). The coated aluminum material of Comparative Example 1 has a silica-containing film with substantially the same P/Si mass ratio as that described in Example 2 of PTL 4, and is free from a silane coupling agent.

In Comparative Example 2, the paint D was subjected to electrostatic powder coating, and was baked in a furnace set at 180° C. for 30 seconds, thereby forming a coating film with a film thickness (total coating film thickness) of 100 µm, resulting in preparation of a specimen (coated aluminum material). In Comparative Example 2, the silane coupling agent content exceeds the upper limit value.

In Comparative Example 3, the paint B was subjected to bar coat coating, and was subjected to a baking treatment at a PMT of 210° C. for 40 seconds to be dried, thereby forming a coating film with a film thickness (total coating film thickness) of 5 µm, resulting in preparation of a specimen (coated aluminum material). The coated aluminum material of Comparative Example 3 has a silica-containing film with substantially the same P/Si mass ratio as that described in Example 9 of PTL 4, and is free from a silane coupling agent.

In Comparative Example 4, the paint B was subjected to bar coat coating, and was subjected to a baking treatment at a PMT of 210° C. for 40 seconds to be dried, thereby forming a coating film with a film thickness of 5 µm. Then, the paint C was subjected to bar coat coating, and was subjected to a baking treatment at a PMT of 225° C. for 60 seconds to be dried, thereby forming a coating film with a film thickness of 30 µm, resulting in preparation of a specimen (coated aluminum material) with a total film thickness of 35 µm. In Comparative Example 4, the P/Si mass ratio is smaller than the lower limit value.

In Comparative Example 5, the paint B was subjected to bar coat coating, and was subjected to a baking treatment at a PMT of 210° C. for 40 seconds to be dried, thereby forming a coating film with a film thickness of 5 µm. Then, the paint C was subjected to bar coat coating, and was subjected to a baking treatment at a PMT of 225° C. for 60 seconds to be dried, thereby forming a coating film with a film thickness of 10 µm, resulting in preparation of a specimen (coated aluminum material) with a total coating film thickness of 15 µm. In Comparative Example 5, the P/Si mass ratio is smaller than the lower limit value.

In Comparative Example 6, the paint B was subjected to bar coat coating, and was subjected to a baking treatment at a PMT of 210° C. for 60 seconds to be dried, thereby forming a coating film with a film thickness of 5 µm. Then, the paint E was coated by a spray gun, thereby forming a 50-µm coating film, and was baked in a heating furnace set at 80° C. for 5 minutes. Further, the paint F was coated by a spray gun, thereby forming a 50-µm coating film, and was baked in a heating furnace set at 80° C. for 10 minutes, resulting in preparation of a specimen (coated aluminum material) with a total coating film thickness of 105 µm. The coated aluminum material of Comparative Example 6 has a P/Si mass ratio exceeding the upper limit.

In Comparative Example 7, the paint B was subjected to bar coat coating, and was subjected to a baking treatment at a PMT of 210° C. for 40 seconds to be dried, thereby forming a coating film with a film thickness of 5 µm. Then, the paint D was subjected to electrostatic powder coating, and was baked in a heating furnace set at 180° C. for 30 minutes, thereby forming a coating film with a film thickness of 50 µm, resulting in preparation of a specimen (coated aluminum material) with a total coating film thickness of 55 µm. The Comparative Example 7 has a silica-containing film with substantially the same P/Si mass ratio as that described in Example 2 of PTL 5, and is free from a silane coupling agent.

In Comparative Example 8, the paint B was subjected to bar coat coating, and was subjected to a baking treatment at a PMT of 210° C. for 40 seconds to be dried, thereby forming a coating film with a film thickness of 5 µm. Then, the paint D was subjected to electrostatic powder coating, and was baked in a heating furnace set at 180° C. for 30 minutes, thereby forming a coating film with a film thickness of 70 µm, resulting in preparation of a specimen (coated aluminum material) with a total coating film thickness of 75 µm. The coated aluminum material of Comparative Example 8 includes a silica-containing film in which a phosphorus compound is not added, the P/Si mass ratio is zero (0), and a silane coupling agent is added in an amount exceeding 21 mass %.

[Corrosion Resistance Test]

As for each specimen of respective Examples and Comparative Examples prepared in the manner described up to this point, the following salt spray test, wetting test, and boiling water immersion test were performed to examine the adhesion, thereby evaluating the corrosion resistance.

With the salt spray test, each specimen of respective Examples and Comparative Examples was cross-cut with the method of JIS K 5600, and a 1000-hour test was carried out. With the salt spray test, evaluation was performed with the evaluation criteria of ⊚: corrosion, swelling, and the like were not caused at the cut part at all, and the adhesion of the cut part was good, ○: the corrosion of the cut part was equal to or smaller than 1 mm in size, and swelling was not caused, and the adhesion was good, and X: the corrosion of the cut part was 1 mm or more in size, or abnormal condition such as occurrence of swelling or poor adhesion was caused, in the coating film after 1000 hours.

With the wetting test, each specimen of respective Examples and Comparative Examples was allowed to stand still in a 50° C. and 95% RH constant temperature constant humidity chamber for 1000 hours. Then, the adhesion of the coating film was evaluated. The adhesion of the coating film was evaluated by rating the case where the area of the cross cut part which had undergone peeling was 5% or less (classification 1 or less) as ⊚; the case of more than 5% and 15% or less as ◯, the case of more than 15% and 35% or less as Δ; and the case of more than 35% as X with the method of adhesion (cross-cut method) of JIS K 5600.

With the boiling water immersion test, each specimen of respective Examples and Comparative Examples was immersed in boiling water for 5 hours. Then, in the same manner as with the case of the wetting test, the adhesion of the coating film was evaluated based on the same evaluation criteria.

The results of the adhesion after the salt spray test, and the wetting test, and the adhesion after the boiling water immersion test are shown in Table 4.

TABLE 4

| | | Examples | | | | | | | | |
|---|---|---|---|---|---|---|---|---|---|---|
| | | 1 | 2 | 3 | 4 | 5 | 6 | 7 | 8 | 9 |
| Coating film configuration | First layer | A | B | B | D | B | C | B | C | B |
| | Second layer | — | E | C | — | A | — | — | — | — |
| | Third layer | — | F | — | — | — | — | — | — | — |
| Coating film thickness (μm) | First layer | 30 | 5 | 10 | 100 | 2 | 20 | 5 | 35 | 40 |
| | Second layer | — | 50 | 30 | — | 30 | — | — | — | — |
| | Third layer | — | 50 | — | — | — | — | — | — | — |
| | Total coating film thickness | 30 | 105 | 40 | 100 | 32 | 20 | 5 | 35 | 40 |
| Composition of silica containing film | Film mass (mg/m$^2$) | 112.1 | 88.88 | 10.6 | 56.75 | 22.4 | 60.4 | 47.7 | 64.4 | 47.7 |
| | Si content (mg/m$^2$) | 44.9 | 36.1 | 4.26 | 22.1 | 8.53 | 22.7 | 21.1 | 23.3 | 21.1 |
| | P content (mg/m$^2$) | 4.84 | 2.01 | 0.35 | 1.34 | 1.07 | 1.07 | 0.54 | 1.07 | 0.54 |
| | P/Si mass ratio | 0.108 | 0.056 | 0.082 | 0.061 | 0.125 | 0.047 | 0.026 | 0.046 | 0.026 |
| | Si content ratio (mass %) | 40.04 | 40.58 | 40.20 | 38.89 | 38.06 | 37.60 | 44.32 | 36.15 | 44.32 |
| | P content ratio (mass %) | 4.31 | 2.27 | 3.29 | 2.37 | 4.80 | 1.78 | 1.13 | 1.66 | 1.13 |
| | Silane coupling agent content ratio (mass %) | 0.71 | 8.43 | 4.71 | 13.21 | 4.46 | 19.87 | 2.10 | 24.84 | 2.10 |
| Evaluation of Corrosion resistance | Salt spray test | ◯ | ⊚ | ⊚ | ⊚ | ⊚ | ⊚ | ◯ | ⊚ | ◯ |
| | Adhesion after wetting test | ⊚ | ⊚ | ⊚ | ⊚ | ⊚ | ⊚ | ⊚ | ⊚ | ⊚ |
| | Adhesion after boiling water immersion test | ⊚ | ⊚ | ⊚ | ⊚ | ⊚ | ⊚ | ⊚ | ⊚ | ⊚ |

| | | | Comparative Examples | | | | | | | |
|---|---|---|---|---|---|---|---|---|---|---|
| | | Ex. 10 | 1 | 2 | 3 | 4 | 5 | 6 | 7 | 8 |
| Coating film configuration | First layer | D | D | D | B | B | B | B | B | B |
| | Second layer | — | — | — | — | C | C | E | D | D |
| | Third layer | — | — | — | — | — | — | F | — | — |
| Coating film thickness (μm) | First layer | 50 | 100 | 100 | 5 | 5 | 5 | 5 | 5 | 5 |
| | Second layer | — | — | — | — | 30 | 10 | 50 | 50 | 70 |
| | Third layer | — | — | — | — | — | — | 50 | — | — |
| | Total coating film thickness | 50 | 100 | 100 | 5 | 35 | 15 | 105 | 55 | 75 |
| Composition of silica containing film | Film mass (mg/m$^2$) | 74.24 | 4.85 | 52.55 | 11.35 | 105.6 | 105.6 | 23.3 | 26.83 | 465 |
| | Si content (mg/m$^2$) | 24.56 | 1.87 | 16.85 | 4.9 | 47.1 | 47.1 | 8.53 | 11.2 | 106 |
| | P content (mg/m$^2$) | 1.34 | 0.27 | 0.81 | 0.27 | 0.81 | 0.81 | 1.34 | 0.81 | 0 |
| | P/Si mass ratio | 0.055 | 0.144 | 0.048 | 0.055 | 0.017 | 0.017 | 0.157 | 0.072 | 0.000 |
| | Si content ratio (mass %) | 33.08 | 38.48 | 32.07 | 43.17 | 44.62 | 44.62 | 36.67 | 41.74 | 22.79 |
| | P content ratio (mass %) | 1.81 | 5.54 | 1.53 | 2.37 | 0.76 | 0.76 | 5.78 | 3.00 | 0.00 |
| | Silane coupling agent content ratio (mass %) | 33.67 | 0.00 | 38.05 | 0.00 | 2.84 | 2.84 | 4.30 | 0.00 | 21.51 |
| Evaluation of corrosion resistance | Salt spray test | ⊚ | ◯ | ◯ | ◯ | X | X | ◯ | ◯ | X |
| | Adhesion after wetting test | ◯ | X | X | X | X | Δ | X | X | X |
| | Adhesion after boiling water immersion test | ◯ | X | X | ⊚ | X | Δ | X | X | X |

The invention claimed is:

1. A method for producing a coated aluminum material, the coated aluminum material including an aluminum material including aluminum or an aluminum alloy, a silica-containing film which consists of colloidal silica, phosphoric acid and a silane coupling agent and is formed on a surface of the aluminum material, and a coating film formed on the silica-containing film, the method comprising:

forming the silica-containing film which is in a solid form and includes the silane coupling agent in a content of 0.71 to 33.67 mass %, and having a Si content falling within the range of 4.26 to 44.9 mg/m$^2$, a P content falling within the range of 0.35 to 4.84 mg/m$^2$, and a P/Si mass ratio of the P content to the Si content falling within the range of 0.026 to 0.125, on the surface of the aluminum material; and then, forming the coating film on the silica-containing film by coating a paint for the coating film on the silica-containing film, wherein an average particle size of the colloidal silica is 10 to 300 nm, the silane coupling agent has a reactive functional group selected from the group consisting of epoxy group, thiol group and amino group, and a film mass of the silica-containing film is 10.6 to 112.1 mg/m$^2$.

2. The method according to claim 1, wherein a thickness of the coating film is 0.5 μm to 200 μm.

3. The method according to claim 1, wherein a thickness of the coating film is 5 μm to 105 μm.

4. The method according to claim 1, wherein
the silica-containing film is formed by a pre-coating method with a roll coating method, a spray coating method, a bar coating method, or an electrostatic coating method, or a post-coating method with a spray coating method, a spin coating method, or an electrostatic coating method.

5. The method according to claim 1, wherein
the coating film is formed by a pre-coating method with a roll coating method, a spray coating method, an immersion method, a bar coating method, or an electrostatic coating method, or a post-coating method with a spray coating method, a spin coating method, an immersion method, or an electrostatic coating method.

6. The method according to claim 1, wherein
the paint for the coating film is a polyester-based paint, an epoxy-based paint, or a polyurethane-based paint.

* * * * *